United States Patent Office 3,522,350
Patented July 28, 1970

3,522,350
PROCESS FOR EXTRACTING AN ANTI-INFLAMMATORY AND ANTI-IRRITANT PRINCIPLE FROM YARROW AND THE PRODUCT PRODUCED THEREBY
Arthur Goldberg, 790 Concourse Village W., New York, N.Y. 10451; Edward Eigen, 8 Glenside Court, East Brunswick, N.J. 08816; Lewis Stone Reeve, 290 River Road, Piscataway, N.J. 08854; Salvatore Joseph De Salva, 83 De Mott Lane, Somerset, N.J. 08873; Robert Anthony Evans, 280 Goldfinch Road, Somerville, N.J. 08876; and Sidney Weiss, 76 Juniper Drive, Levittown, Pa. 19056
No Drawing. Filed Nov. 10, 1969, Ser. No. 875,593
Int. Cl. B01d 15/08
U.S. Cl. 424—195
3 Claims

ABSTRACT OF THE DISCLOSURE

A process for extracting an anti-inflammatory and anti-irritant principle from yarrow, Achillea millefolium, including the steps of extraction of the active principle with water, precipitation with lead acetate, decomposition with sodium carbonate, cation exchange chromatography, cellulose column chromatography, chromatography on nylon, and gel-filtration chromatography on Sephadex G-75 and G-50.

---

This invention relates to a novel water soluble, non-steroidal, anti-inflammatory and anti-irritant principle having a low toxicity and a method of producing the novel principle.

Achillea millefolium, hereinafter referred to as yarrow, is a perennial herb very common in Europe and America. The plant is from 12 to 18 inches in height and is specifically distinguished by it doubly pinnate, downy, minutely divided leaves with linear, dentate, mucronate divisions, by its furrowed stem and involucre, and by its dense corymbs of flowers which appear throughout the summer. The flowers are flat-topped clusters, are in the form of ray flowers numbering 4 to 6 per head, and are white, pink, or yellow. The fruits of the flowers are pale gray or straw-colored thin oblong wafers. Both the flowers and leaves of yarrow have an agreeable, though feeble, aromotic odor and a bitterish, astringent, pungent taste.

The ability to reduce inflammation has been reported for many substances with various chemical configurations. At present, steroidal and nonsteroidal structures are recognized as the two classes of anti-inflammatory agents.

Hydrocortisone is a classical example of a steroid and was one of the earliest steroids discovered. It was originally obtained from the adrenal cortex and was found to be an effective anti-inflammatory agent. Dexamethasone-21 phosphate, one of the more recently synthesized and potent water soluble steroidal agents, was used as a control in the instant study.

Nonsteroidal compounds have been investigated over the past several years because they exert fewer side effects than do steroids. Steroids have been known to cause numerous adverse reactions such as increased blood pressure, convulsions, suppression of growth in children, insomnia, nervousness, and many others.

Anti-inflammatory agents have many different chemical structures, but none are ideal since they all exert some side effects. However, novel nonsteroidal anti-inflammatory agents are highly desirable since they produce fewer adverse reactions and are thus safer to use.

The instant extract has many uses in topical and systemic formulations for the treatment of allergies, acne, psoriasis, and wounds, where currently predominately steroidal agents are effective.

Accordingly, it is a primary advantage of the present invention to provide a novel anti-inflammatory and anti-irritant principle and a process for its production.

Another advantage is to provide a water soluble, non-steroidal, anti-inflammatory and anti-irritant principle having a low toxicity.

Other objects and advantages of this invention will become apparent to those skilled in the art from the following invention description, examples thereof, and the appended claims.

Preparation of the initial extract for biological testing.—The initial evaluation of yarrow for anti-inflammatory activity was carried out on a cold aqueous extract of the dry flower heads. The extract was dried by lyophilization and tested.

Isolation and characterization of the active principle.—The dry flower heads of yarrow (1.3 kilograms) were extracted with $CHCl_3$ for 24 hours in a Soxhlet apparatus. (This step is optional.) The marc was air dried and extracted with 12 liters of water at 65 to 75° C. The aqueous extract was evaporated under vacuum to a small volume and lyophilized in a Virtis Freeze Mobile model 10, yielding 42 grams of brown material (Fraction I). Fraction I gave positive tests with ferric chloride, lead acetate, and Prussian Blue reagents suggesting the presence of phenolic-type compounds. Negative tests with Mayer's and Hager's reagents indicated the absence of alkaloids.

Twenty grams of Fraction I were added to 1 liter of water, and the insoluble residue was removed by centrifugation and discarded. A saturated solution of $Pb(OAc)_2$ was slowly added to the aqueous solution of Fraction I until no further precipitation occurred. The precipitate was collected by centrifugation, and the supernatant was placed on a cation exchange column [1] to remove any lead present as $Pb(OAc)_2$. The combined aqueous and ethanolic eluate (Fraction II) from this column was tested biologically and found to be inactive. The lead precipitate was washed with distilled water and decomposed by addition of a 10 percent solution of $Na_2CO_3$ which was added until a pH of 9 was attained. The resulting $PbCO_3$ was removed by centrifugation.

The supernatant was placed on a cation exchange column [1] whch was eluted with mater resulting in a 29 percent yield of active material (Fraction III). Elution of the column with 95 percent ethanol resulted in Fraction IV which was tested and found to be inactive.

When Fraction III was tested with ferric chloride, lead acetate, and Prussian Blue reagents, positive tests were again obtained. This fraction was tested, therefore, for the presence of flavonoid compounds using the color reactions described by K. Venkataraman in "The Chemistry of Flavonoid Compounds," Geissman, T. A., ed., MacMillan Co., New York, N.Y., 1962, pp. 72–75. The test reagents used were aqueous sodium hydroxide, concentrated sulfuric acid, magnesium-hydrochloric acid, and sodium amalgam followed by hydrochloric acid. All of these tests were negative, thereby excluding the presence of flavonoid-type compounds.

It was observed that, when an aqueous solution of Fraction III was shaken, a stable honeycomb froth formed which is characteristic of saponins. Fraction III was then tested for steroidal and triterpenoid saponins using the blood hemolysis test of M. E. Wall et al., Analytical Chemistry; 29, 1337 (1952). No hemolysis of red blood ---
[1] Amberlite CG-50, hydrogen form, Rohm and Haas Co., Philadelphia, Pa.

cells occurred, thus eliminating the above classes of compounds.

Chromatography of Fraction III on a cellulose column [2] resulted in Fractions V and VI. Fraction V was obtained by elution with n-butanol saturated with water and was found to be inactive. This elution was followed by an aqueous elution which resulted in a 61 percent yield (18 percent overall yield) of active material (Fraction VI).

Fraction VI was chromatographed on a nylon column [3] yielding Fractions VII through X. Elution of the column with 100 percent methyl alcohol resulted in Fraction VII which was inactive. Fractions VIII through X were obtained by elution of the column with MeOH-$NH_3$(10:1), MeOH-$H_2O$-$NH_3$(5:5:1), and $H_2O$-$NH_3$(10:1), respectively. They represent a combined yield of 34 percent (6 percent overall yield); all were active. All four fractions were tested with Molisch and Lowry reagents to detect the presence of carbohydrates and proteins, respectively. Fraction VII gave negative tests with both reagents while Fractions VIII through X gave positive tests with these reagents. It should be mentioned that all of the previous fractions isolated were then tested with these reagents. Negative tests resulted with all of the inactive fractions while positive tests resulted with all of the active fractions.

Purification was continued on the most active of the above fractions (Fraction IX), which was isolated in a 13 percent yield (2.3 percent overall yield). Gel-filtration chromatography on Sephadex G–75 [4] using distilled water yielded Fractions XI through XIII all of which were active. Fraction XII, however, possessed more than twice the activity of Fractions XI and XIII, thus characterization of Fraction XII was undertaken.

Fraction XII gave positive tests with Lowry and Molisch reagents indicating the presence of proteins and carbohydrates, respectively. It also gave positive tests with ferric chloride, lead acetate, and Prussian Blue reagents which may now be attributed to the presence of proteins. A negative Benedict's test showed the absence of free reducing sugars. Ninhydrin reagent also gave a negative test suggesting that the presence of free amino acids in

[2] MN–2100 cellulose powder, Brinkmann Instruments, dist., Westbury, N.Y.
[3] Ultramide powder, BASF in Ludwigshafen, Alupharm Chemicals, dist., New Orleans, La.
[4] Pharmacia Fine Chemicals Inc., Piscataway, N.J.

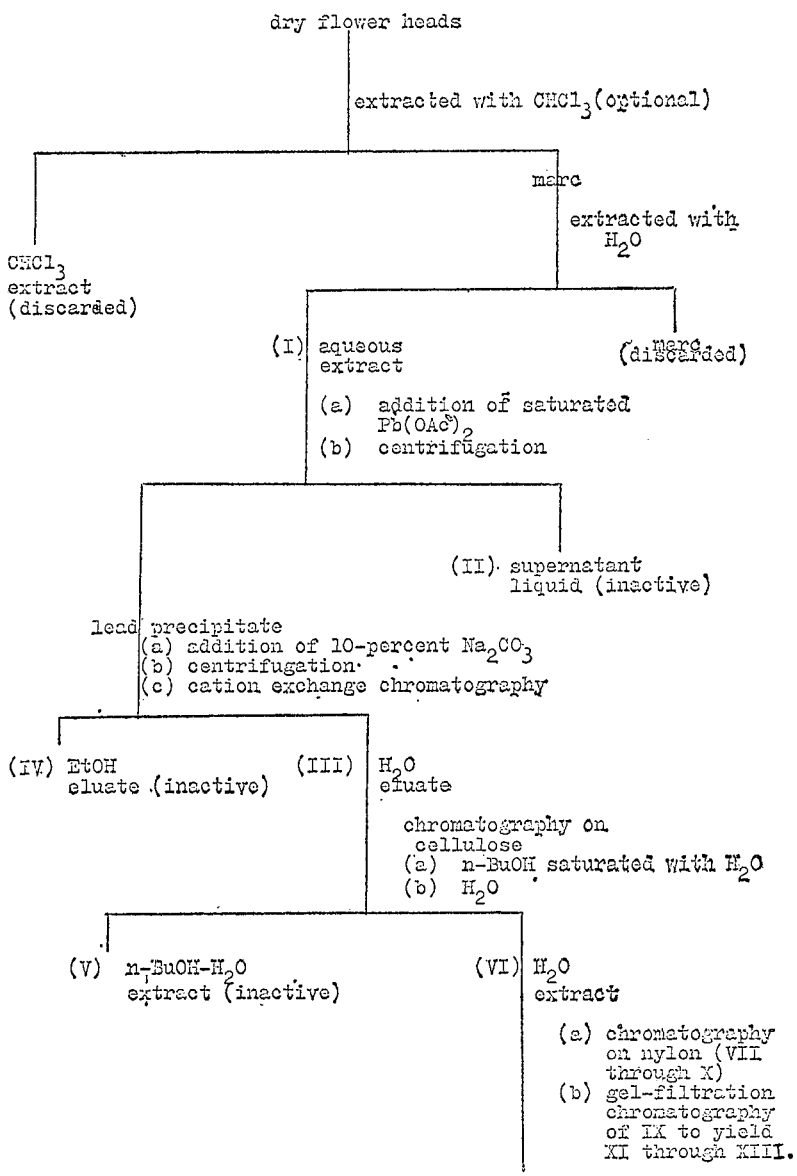

Fractionation of Yarrow

Fraction XII is unlikely. Elemental analysis showed the following results: N, 4.07; S, 1.56; P, 0.28 percent. A pure protein contains an average of 16 percent nitrogen. If the percent nitrogen obtained is attributed only to the presence of proteins, then Fraction XII contains a maximum of 25 percent protein based on this nitrogen value.

Disc electrophoresis.—Fraction XII was subjected to disc electrophoresis using a Canalco Model 12 disc electrophoresis apparatus. Electrophoresis was carried out in 7.5 percent acrylamide gel using a tris-glycine buffer at pH 8.3 with ionic strength of 0.01 and a current of 5 milliamperes per column. The time required for the separations was approximately 35 minutes. The gels were stained with Coomassie Brilliant Blue [5] which detects proteins and with periodic acid-Schiff reagent which is used to detect glycoproteins, polysaccharides, and high molecular weight carbohydrates. Two bands were observed, and each gave positive tests with both of these reagents.

A molecular weight for the material comprising Fraction XII was estimated to be between 30,000 and 70,000 using gel-filtration chromatography on Sephadex G–25, G–50, and G–75 gels. A small variation of these range limits is possible, however, since the above values were obtained using the fractionation ranges of these gels which are based on globular proteins. The molecular weights of some glycoproteins calculated from calibration curves using globular proteins have been found to deviate from their expected values.

Amino acid analysis.—A sample of Fraction XII was hydrolyzed by treating it with 6 N hydrochloric acid in a sealed tube at 110° C. for 24 hours. Amino acid analysis was carried out using a Technicon Auto Analyzer, and the results are shown in Table 1. Seven unknown peaks with very short elution times were observed which absorbed more strongly at 440 m$\mu$ than at 570 m$\mu$. Such peaks are characteristic of non-nitrogenous compounds related to carbohydrates.

TABLE 1.—AMINO ACID ANALYSIS OF FRACTION XII

| Compounds present: | Moles per $10^3$ moles |
|---|---|
| Cysteic acid | 16.4 |
| Hydroxyproline | 59.1 |
| Methionine sulfoxide | 9.4 |
| Aspartic acid | 130.2 |
| Threonine | 49.3 |
| Serine | 68.6 |
| Glutamic acid | 125.4 |
| Proline | 46.8 |
| Glycine | 168.6 |
| Alanine | 64.6 |
| Valine | 50.0 |
| Cystine (½) | 49.8 |
| Methionine | 4.3 |
| Isoleucine | 20.9 |
| Leucine | 35.4 |
| Tyrosine | 10.1 |
| Phenylalanine | 13.4 |
| Hydroxylsine [1] | — |
| Ornithine | 2.3 |
| Lysine | 24.1 |
| Histidine | 7.1 |
| Unknown amino acid | 25.0 |
| Arginine | 19.2 |

[1] Only a trace peak was observed.

Sugar analysis.—A sample of Fraction XII was hydrolyzed with 3N hydrochloric acid in a sealed tube for 3 hours at 110° C. The hydrolysate was neutralized by passing it through an anion exchange column [6] in the carbonate form. Sugar analysis was performed using a Technicon Auto Analyzer according to the method of G. N. Catravas as reported in "Technicon Symposia, Automation in Analytical Chemistry," vol. I, Mediad Inc., White Plains, N.Y., 1966, pp. 397–400. The major sugars characterized from the chromatogram obtained were glucose, xylose, and arabinose. Rhamnose, mannose, and galactose were also detected along with five unknown peaks.

Numerous pharmacological tests were made to test both the topical and systemic anti-inflammatory activities of the yarrow extract. In addition tests were made comparing the activity of the instant nonsteroidal yarrow extract with the activities of well known steroidal compounds. The Mouse Paw Edema Assay and the Rat Granuloma Assay indicate the utility of the instant yarrow extract for systemic purposes, and the Rabbit Skin Irritation Test measures the effectiveness of the extract in topical treatments.

PHAMACOLOGICAL TESTS

Mouse Paw Edema Assay

Swiss-Webster female mice (18 to 25 grams) were injected with 0.125 milligram brewer's yeast in the left foot pad and immediately thereafter the test solution was injected subcutaneously into the scapular area. After three hours the assay was terminated and all animals were sacrificed by cervical fracture and their feet were severed at the ankle joints and weighed. The greater the difference between right and left foot weights, the larger the edema. Mice treated with an active preparation had small differences between left and right foot weights. Eight mice were used for each fraction tested. All yarrow fractions were tested at a dose level of 40 mg./kg., since initial tests at this dosage of the crude extract produced a significant response.

The activities of the major fractions isolated are reported in Table 2 along with the activities of some known anti-inflammatory agents.

TABLE 2.—ANTI-INFLAMMATORY ACTIVITIES IN THE MOUSE PAW EDEMA TEST

| Compound | Dose, mg./kg. | Percent decrease in inflammation |
|---|---|---|
| Corticotrophin | [1]10 | −53 |
| Acetylsalicylic acid | 40 | −19 |
| Phenylbutazone | 40 | −26 |
| Dexamethasone-21 phosphate | 10 | −42 |
| Hydrocortisone acetate | 40 | −62 |
| Indomethacin | 40 | −44 |
| Fraction:[2] | | |
| III[4] | 40 | −34 |
| VI[18] | 40 | −29 |
| IX[14] | 40 | −25 |
| XI[3] | 40 | −10 |
| XII[3] | 40 | −35 |
| XIII[3] | 40 | −15 |

[1] USP units/kg.
[2] Superscripts designate the number of times a fraction was tested.

Topical anti-inflammatory activity

Topical anti-inflammatory activity was evaluated by a modification of the Rabbit Skin Irritation Test of Draize. Irritation was induced with sodium lauryl sulfate using a ratio of test material to sodium lauryl sulfate of 5:20 (mg./ml.). Fraction VI produced a 50 percent reduction of inflammation when subjected to this test. The matured, dried and weathered yarrow blossoms were reduced to a fine powder by means of a blender. Fifteen grams of this powder were blended with 300 milliliters of cold water for 20 minutes. The suspension was filtered at 24 hours and the filtrate lyophilized. The yield was 405 milligrams or 2.7 percent.

The backs of six rabbits were clipped free of hair and divided into six sections. The test preparations were made up on a w./w. basis; that is, a solution of 1:4 yarrow and sodium lauryl sulfate (SLS) would contain 5 mg.:20 mg. per ml., respectively.

All solutions were adjusted to pH 7.0. A cotton swab was saturated with the test solution and vigorously rubbed into its assigned area for 10 seconds. This was re-

---

[5] Mann Research Laboratory, Inc., New York, N.Y.
[6] Dowex 1–X4, J. T. Baker Chemical Co., Phillipsburg, N.J.

peated at 10-minute intervals until 8 applications had been made. The sites were scored for erythema and edema at 24 and 72 hours. The results are shown in Tables 3 and 4 and are compared with arginine, an amino acid effective in reducing irritation.

The scoring method of the Draize Method was modified by squaring the Draize Method scores and adding the erythema and edema values together. This was done to more adequately weigh the scores and more realistically show the degree of irritation.

TABLE 3.—THE EFFECT OF TOPICALLY APPLIED COLD WATER EXTRACT OF YARROW ON SODIUM LAURYL SULFATE-INDUCED SKIN IRRITATION SCORES

| Interval | Sites | SLS | Plus SLS 1:4 | Plus SLS 1:20 | Plus SLS 1:200 | Arginine (free base) plus SLS 1:4 |
|---|---|---|---|---|---|---|
| 24 hours | 1 | 13 | 2 | 5 | 13 | 8 |
|  | 2 | 18 | 8 | 8 | 8 | 13 |
|  | 3 | 13 | 0 | 5 | 13 | 8 |
|  | 4 | 13 | 13 | 5 | 8 | 5 |
|  | 5 | 8 | 5 | 5 | 2 | 5 |
|  | 6 | 18 | 5 | 8 | 2 | 2 |
|  | $\overline{X}$ | 13.8 | 5.5 | 6.0 | 7.7 | 6.8 |
| 72 hours | 1 | 13 | 1 | 2 | 5 | 5 |
|  | 2 | 18 | 13 | 5 | 8 | 13 |
|  | 3 | 8 | 1 | 2 | 5 | 13 |
|  | 4 | 18 | 13 | 13 | 8 | 2 |
|  | 5 | 8 | 5 | 0 | 1 | 5 |
|  | 6 | 18 | 8 | 8 | 0 | 0 |
|  | $\overline{X}$ | 13.8 | 6.8 | 5.0 | 4.5 | 6.3 |

TABLE 4.—THE DATA FROM TABLE 3 EXPRESSED AS PERCENT REDUCTION IN IRRITATION PERCENT REDUCTION IN IRRITATION BASED ON CONTROL

| Interval | Yarrow 1:4 with SLS | Yarrow 1:20 with SLS | Yarrow 1:200 with SLS | Arginine 1:4 with SLS |
|---|---|---|---|---|
| 24 hours | 46 | 43 | 34 | 39 |
| 72 hours | 39 | 49 | 52 | 42 |

A cold water extract of yarrow was tested for activity in adrenalectomized and non-adrenalectomized mice following the same procedure used in the Mouse Paw Edema Assay. Identical activity resulted in both types of mice when this fraction was tested.

A visual examination was made of intact and abraded rabbit skin into which was rubbed a 2 percent solution of SLS and a solution of yarrow and SLS in a ratio of 1:5. As is seen from Table 5 there is an obvious increase in wound repair.

TABLE 5.—EFFECT OF COLD WATER EXTRACT OF YARROW ON SODIUM LAURYL SULFATE-INDUCED IRRITATION ON RABBIT SKIN

| | Treatment of skin | Degree of Erythema and Edema (Days on Test) | | |
|---|---|---|---|---|
| | | 1 | 3 | 7 |
| Preparations: | | | | |
| SLS | Intact | Mild | Moderate | Moderate. |
| | Abraded [1] | Moderate | Severe | Do. |
| Yarrow plus SLS | Intact | Mild | Normal | Normal. |
| | Abraded | do | Mild | Do. |

[1] Skin abraded with superficial cuts using a scalpel.

Comparison of yarrow with Decadron

Decadron, dexamethasone-21 phosphate, is 25 to 30 times as potent as hydrocortisone when used either topically or systemically as an anti-inflammatory agent. The following study was designed to compare the topical effectiveness of Decadron and yarrow in reducing detergent-induced skin irritation. The yarrow used was a cold water, dialyzed, and heat-dried fraction.

TABLE 6.—COMPARISON OF YARROW WITH DECADRON

| Preparation | Ratio of preparation to SLS, 2 percent | Time on Test | | | |
|---|---|---|---|---|---|
| | | 24 hours | | 48 hours | |
| | | $\overline{X}$* | ii† | $\overline{X}$ | ii |
| SLS | | 8.7 | 1.0 | 7.3 | 1.0 |
| Decadron | 1:20 | 4.0 | 0.46 | 2.7 | 0.37 |
| | 1:200 | 1.7 | 0.19 | 3.8 | 0.52 |
| | 1:1000 | 8.1 | 0.83 | 8.1 | 1.1 |
| Yarrow | 1:20 | 5.7 | 0.66 | 4.5 | 0.62 |
| | 1:1000 | 6.0 | 0.69 | 6.8 | 0.94 |

* Average of degree of irritation.

† Irritation index = $\dfrac{\overline{X} \text{ preparation}}{\overline{X} \text{ SLS}}$ The 48-hour readings indicate that a concentration related response occurred. Both Decadron and yarrow were very effective at the 1:20 ratio with the Decadron approximately twice as potent as yarrow. As can be seen from Tables 4 and 6 there is obvious reduction of irritation on the abraded and intact skin when yarrow is combined with sodium lauryl sulfate.

Rat Granuloma Assay

Basic method.—The method of Goldstein et al. in "A Method for Differentiating Non-specific Irritants From Anti-Inflammatory Agents Using the Carrageenan Abscess Test," Proceeding of the Society for Experimental Biology and Medicine 123 (3), pp. 712–715 (1966) was used to differentiate active anti-inflammatory from nonspecific counter-irritant effects.

A known irritant, carrageenan—a muco-polysaccharide—was injected subcutaneously at the base of the tail in the animals of Group 1. Simultaneously, either an anti-inflammatory agent or another irritant was injected subcutaneously into the scapular area. In Group 2, the anti-inflammatory or irritant was mixed with the carrageenan and injected subcutaneously into the scapular area. An abscess developed at the base of the tail in all animals after 24 hours. Difference in abscess weight was used to differentiate a true anti-inflammatory from nonspecific counter-irritant substance. One milliliter of a 2 percent carrageenan solution was used.

The true anti-inflammatory substance reduced the tail abscess weight whether it was injected into the tail site or into the scapular site. The irritant injected into the tail site increased the abscess weight over that which was obtained in the control rat. When the irritant was injected at a distal site (scapular area), the abscess weight decreased.

Assay of known counter-irritants and anti-inflammatory drugs

The results in Table 7 show that all anti-inflammatory drugs tested decreased granuloma weight. All appeared to work more efficiently when injected with the carrageenan directly. The irritants decreased the abscess weight when injected at the scapular site. When an irritant was injected with carrageenan at the tail site, the area appeared extremely inflamed and the exudates were bloody. However, only when 50 mg./kg. of croton oil was injected at the tail site was there an increase in abscess weight.

TABLE 7.—EFFECT OF DRUGS AND IRRITANTS IN THE RAT GRANULOMA ASSAY

[Percent Increase or Decrease in Abscess Weight]

| | Dose, mg./kg. | Scapula | Tail |
|---|---|---|---|
| Known anti-inflammatories: | | | |
| Acetylsalicylic acid | 312.5 | −31 | −72 |
| Dexamethazone-21 phosphate | 10 | −55 | −61 |
| Hydrocortisone acetate | 5 | −9 | −32 |
| | 50 | −31 | −21 |
| Phenylbutazone | 12.5 | −17 | −33 |
| | 150 | −26 | −35 |
| Known Counter-Irritants: | | | |
| Croton oil | 15.75 | −7 | −28 |
| | 50 | −6 | +26 |
| | 100–125 | −30 | −14 |
| Formalin | 250 | −24 | −31 |
| Yarrow Fraction XII 3-2771-106-25-31 | 40 | −8 | −14 |

In order to ascertain whether the active principles act as true anti-inflammatory compounds or counter-irritants, tests were performed with both adrenalectomized and non-adrenalectomized mice. The results of these studies show that the presence of the adrenal glands is not needed for activity. These fractions most likely exert a true anti-inflammatory response. If they function as counter-irritants, the adrenal gland is a critical intermediate site of action which may be activated either indirectly by the release of ACTH from the hypophysis or directly through an unknown mechanism in the adrenal cortex. Results are shown in Table 8.

TABLE 8.—EFFECT OF YARROW ON RAT GRANULOMA ASSAY IN NON ADRENALECTOMIZED AND ADRENALECTOMIZED RATS

[Percent Increase(+) or Decrease(−) in Granuloma Weight]

| | Dose, mg./kg. | Non-Adrenalectomized | | Adrenalectomized | |
|---|---|---|---|---|---|
| | | Scapula | Tail | Scapula | Tail |
| Yarrow fraction: | | | | | |
| 3-2608-125 | 50 | | | +26 | +9 |
| 3-2771-83-2BM., MS | 50 | | | +14 | +7 |
| 3-2771-106-25-31 [1] | 40 | −8 | −14 | −14 | −23 |
| 3-2771-117-2 [1] | 50 | +7 | +12 | −21 | −14 |
| 3-2771-117-2 [1] | 50 | | | +9 | +55 |

[1] These experiments were made with both non-adrenalectomized and adrenalectomized saline controls. Test groups were evaluated against these controls. All other experiments with adrenalectomized rats were made using non-adrenalectomized yarrow-treated rats as controls.

To check the procedure more carefully, the experiments were expanded using non-adrenalectomized and adrenalectomized saline controls. Test groups were evaluated against these controls (Table 8). Yarrow preparations, 3-2771-106-25-31 and 3-2771-117-2 gave more significant results. The purest preparation tested, 3-2771-106-25-31 (Fraction XII) showed activity even in the absence of the adrenal glands.

The Mouse Paw Edema Assay and the Rat Granuloma Assay were used in both adrenalectomized and intact animals to determine if the yarrow activity were due to a mixture of pharmacological properties. The tests in adrenalectomized mice showed that the activity was not due to counter-irritability but rather to direct activity in the inflamed site. This finding, however, did not eliminate the idea that a contaminant was mixed with the active component. Results in the Rat Granuloma Test indicated that an irritant or contaminant did accompany the active ingredient in most cases. However, as the purity of the fraction increased, the presence of the contaminant diminished. As can be seen from Fraction XII (3-2771-106-25-31) in Table 8 this type of contaminant is no longer evident.

Acute toxicity studies.—Toxicity studies on Fraction VI showed that both the oral $LD_{50}$ and subcutaneous $LD_{50}$ in mice are equal to or greater than 1000 mg./kg. A diuretic effect was also observed at a dose level of 100 mg./kg., and the urine at this dosage was dark brown.

DISCUSSION

Analysis of the extract

All of the fractions possessing activity were water soluble and gave positive tests for proteins and carbohydrates. Tests for alkaloids, saponins, flavonoids, and reducing sugars throughout the isolation procedure showed that these classes of compounds are absent. No proteins or carbohydrates were detected in any of the inactive fractions.

A preliminary characterization of Fraction XII showed that it contained approximately 25 percent protein based on an elemental analysis for nitrogen (4.07 percent). Since no compounds other than protein and carbohydrates were detected, Fraction XII should contain a very high percentage of carbohydrates. Disc electrophoresis on Fraction XII gave two bands demonstrating that it was not homogeneous. Each of these bands gave positive tests for protein and carbohydrates indicating that the protein was linked to the carbohydrate.

Additional evidence to support the linkage of the protein to the carbohydrate was the use of nylon chromatography in the fractionation procedure which eventually led to the isolation of Fraction XII. Separation of compounds on nylon is based on the different hydrogen-bonding affinities of these compounds toward nylon. The presence of a mixture of protein and carbohydrate components in the same fraction would require that they possess the same hydrogen-bonding characteristics toward nylon. Similar hydrogen-bonding properties of these compounds are highly unlikely since proteins will hydrogen bond mainly through their amide groups while carbohydrates will hydrogen bond mainly through their hydroxyl groups. This strongly suggests that the active principle is a mixture of closely related protein-carbohydrate complexes or glycoproteins. The term protein-carbohydrate complex is preferred rather than glycoprotein to describe the active principle because glycoproteins usually contain a higher percentage of protein than was found in Fraction XII.

Glycoproteins are known to be involved in the inflammation process and have been found to accumulate at the site of inflammation but their role is still unclear. It has been postulated that they are retained at the site of inflammation for tissue repair. This, however, is the first report of protein-carbohydrate complexes acting as anti-inflammatory agents.

It is to be understood that the foregoing detailed description is merely given by way of illustration and that many variations may be made therein without departure from the spirit of the invention. The abstract given above is merely for the convenience of searchers and is not to be given any weight in defining the scope of the invention.

What is claimed is:

1. A process for producing an active principle from yarrow comprising:

(a) extracting an active material with water, (b) precipitating said material with lead acetate, (c) decomposing said material with sodium carbonate, (d) chromatographing said material on a cation exchange column,
(e) chromatographing said material on a cellulose column,
(f) chromatographing said material on a nylon column, and
(g) chromatographing said material on a gel-filtration column to obtain an active principle.

2. A process for producing from yarrow an active water soluble, nonsteroidal, anti-irritant and anti-inflammatory principle having a low toxicity comprising:
   (a) extracting an active material with water to form an aqueous eluate,
   (b) precipitating the aqueous eluate with lead acetate and centrifuging to form a lead precipitate,
   (c) decomposing said lead precipitate with sodium carbonate and centrifuging,
   (d) forming an aqueous eluate by cation exchange chromatography,
   (e) forming an aqueous extract by cellulose column chromatography using a butanol saturated with water eluation followed by an aqueous eluation,
   (f) forming an eluate by nylon column chromatography using a methanol-water-ammonia eluation, and
   (g) forming an active principle by gel-filtration chromatography using an aqueous eluation.

3. The active principle produced by the process according to claim 1.

References Cited

UNITED STATES PATENTS

| | | | |
|---|---|---|---|
| 88,554 | 4/1869 | Deal | 424—195 |
| 120,333 | 10/1871 | Schmid | 424—195 |
| 120,705 | 11/1871 | Brecht | 424—195 |
| 166,249 | 8/1875 | Thalberg | 424—195 |
| 303,603 | 8/1884 | Haeberle | 424—195 |
| 392,776 | 11/1888 | Bizzozero et al. | 424—195 |
| 400,967 | 4/1889 | Sutherland | 424—195 |
| 434,727 | 8/1890 | Schmidt | 424—195 |
| 2,567,362 | 9/1951 | Berkman et al. | 210—31 X |
| 2,695,862 | 11/1954 | Rickes et al. | 210—31 X |

JAMES L. DE CESARE, Primary Examiner

U. S. Cl. X.R.

210—31, 198